United States Patent [19]

Rasmus

[11] 4,098,182
[45] Jul. 4, 1978

[54] PRESS FOR REMOVING LIQUIDS FROM AMORPHOUS MATERIAL

[75] Inventor: Boyd R. Rasmus, Fridley, Minn.

[73] Assignee: The Pillsbury Company, Minneapolis, Minn.

[21] Appl. No.: 687,275

[22] Filed: May 17, 1976

[51] Int. Cl.² .............................................. B30B 9/20
[52] U.S. Cl. .................................. 100/121; 100/112; 100/148; 210/415
[58] Field of Search ........ 100/112, 116, 117, 126–129, 100/144–150, 37, 21; 210/109, 415; 425/376, 84

[56] References Cited

U.S. PATENT DOCUMENTS

| | | | |
|---|---|---|---|
| 863,885 | 8/1907 | Schneider et al. | 100/127 X |
| 1,772,262 | 8/1930 | Naugle | 100/116 X |
| 1,990,992 | 2/1935 | Lang et al. | 210/415 X |
| 2,104,197 | 1/1938 | Johansen | 100/145 |
| 3,126,818 | 3/1964 | Koelsch | 100/117 X |
| 3,243,041 | 3/1966 | Cowan | 210/415 X |
| 3,363,759 | 1/1968 | Clarke et al. | 210/415 X |
| 3,695,173 | 10/1972 | Cox | 100/112 X |

FOREIGN PATENT DOCUMENTS 1,126,882  7/1956  France ................... 210/415

*Primary Examiner*—Peter Feldman
*Attorney, Agent, or Firm*—James V. Harmon; Michael D. Ellwein; Mart Matthews

[57] ABSTRACT

A press is provided comprising a supporting framework, a tubular screen mounted upon the framework and a drum having tapered i.e. conical ends journaled for rotation coaxially within the screen and spaced a short distance from the inside surface of the screen. One or more scraping blades is attached to the drum in position to scrape the inside surface of the screen as a motor turns the drum. A moist elastic food product is introduced into the space between the screen and the drum and subjected to pressure during operation causing the moisture to be pressed through the screen. The press can be used for increasing the solids content of hydrated vital wheat gluten from about 22 percent to about 30 percent.

6 Claims, 7 Drawing Figures

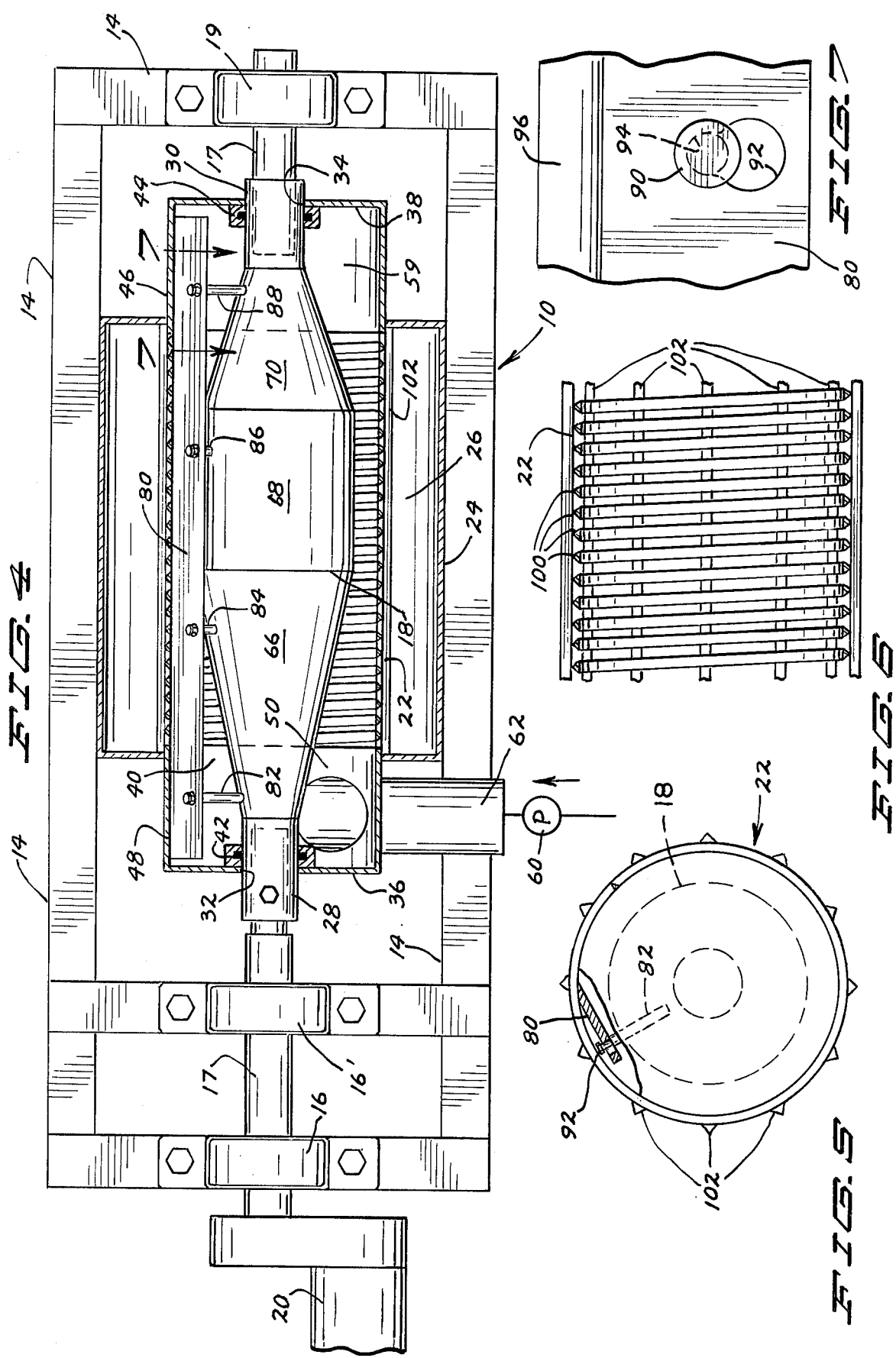

PRESS FOR REMOVING LIQUIDS FROM AMORPHOUS MATERIAL

FIELD OF THE INVENTION

The present invention relates to extraction presses and more particularly to a press for removing water or other fluid from amorphous material.

THE PRIOR ART

In the past it has been a difficult problem to effectively remove moisture from rubbery or elastic food substances such as hydrated vital wheat gluten which holds moisture very tenaciously. Dried gluten, when freshly hydrated, is very elastic and rubbery, somewhat like bubblegum after it has been chewed. Ordinarily, after being mixed with water and kneaded, the mass will have a solids content of about 22 percent by weight. For further processing, the solids content should be increased to more than 25 percent and usually to about 30 percent by weight. Since the hydrated gluten is amorphous and non-fibrous in character it has a strong tendency to blind ordinary press screens used in the past. This of course interferes with moisture extraction. In the course of developing the present invention, some commercially available presses were tried for dewatering vital wheat gluten but were found unsuitable primarily because of screen blinding, poor dewatering or the flow of excessive amounts of gluten through the screen. It was found, for example, that ordinary woven wire screens of the commercially available types were unsuitable. In addition, the overall design of these presses apart from the screen was found unsatisfactory. Many prior presses maintain the material being treated in a body several inches on a side. It was however discovered that water could not be efficiently removed from a body of hydrated vital wheat gluten having dimensions of several inches on a side.

OBJECTS

In view of these and other deficiencies of the prior art, the invention has the following objects: (a) the ability to remove liquid from amorphous substances without excessive screen blinding, (b) the ability to effectively remove a substantial amount of water from gluten to increase the solids content from about 22 percent to about 30 percent by weight in a single pass, (c) to allow relatively little of the food material to pass through the screen with the water, (d) to operate over extended periods of time for dewatering hydrated gluten at a rate of about 5000 pounds or more per hour while increasing the solids content from about 22 percent to about 30 percent in a single pass, (e) to accomplish dewatering with a single moving unit, (f) the provision of an improved dewatering screen which is far superior to woven metal screen or perforated metal plates used in commercially available presses, (g) a reduction in the press size and cost, (h) the provision of a dewatering press which is adaptable to handle variations in flow rates and does not need constant speed adjustment to compensate for flow variation, (i) the provision of a novel screen with a wiping means which cleans the screen and makes it possible to use smaller openings than can be used with commercially available screens, (j) the provision of an apparatus for reliably removing water from various elastic non-fibrous food substances.

THE FIGURES

FIG. 1 is a plan view of the invention.
FIG. 2 is a side elevational view of the invention.
FIG. 3 is an end elevational view.
FIG. 4 is a horizontal sectional view taken on line 4—4 of FIG. 2 on a somewhat larger scale.
FIG. 5 is a transverse sectional view of the screen showing the drum in dotted lines.
FIG. 6 is a longitudinal transverse sectional view of the screen.
FIG. 7 is a partial sectional view taken on line 7—7 of FIG. 4 on a somewhat larger scale.

SUMMARY OF THE INVENTION

A press is provided comprising a supporting framework, a pressure chamber, a screen mounted upon the framework and forming a portion of the chamber and means is preferably provided for scraping the interior i.e., high pressure surface of the screen. A means such as a pump is connected to the chamber for introducing material into the chamber under pressure. Movement is imparted to the scraping means by a motor to move it relative to the screen.

A moisture containing substance is introduced into a pressure chamber and subjected to pressure during operation causing a portion of the moisture to be pressed through the screen. The press can be used, for example, for dewatering hydrated vital wheat gluten to increase the solids content from about 22 percent to about 30 percent by weight. All proportions and quantities herein are expressed on the basis of weight. In one preferred form of the invention the screen is composed of spaced elements e.g. bars with coplanar inward surfaces. In accordance with a preferred form of the invention, the pressure chamber is provided with a curved e.g. cylindrical surface. At least a portion of the chamber is composed of the screen which serves to separate liquid from the hydrated solids as a result of the pressure existing within the chamber. The scraper is preferably a blade mounted for scraping the inside surface of the screen by being rotated about the central longitudinal axis of the screen.

In accordance with a preferred form of the invention, a portion of the chamber is defined by a solid wall which may be a portion of a drum or cone. The chamber has an inlet to which a pump is connected for forcing hydrated solids into the chamber. At the other end of the chamber is an outlet through which the dewatered solids are exhausted. It is also preferred that the chamber have a progressively decreasing cross-section preceding from the inlet toward the outlet. This can take the form of a tapered throat. In the form of the invention to be discribed in detail, the tapered throat comprises a chamber defined by a cylindrical screen on its outside surface and a conical interior surface defined by a solid cone, i.e., the imperforate wall of a conical drum journaled for rotation within the screen. The chamber can also include an imperforate circular end wall nearest the small end of the cone. In this form of the invention, the drum includes a cylindrical segment adjacent to and having the same diameter as the large end of the cone. At the opposite end of the cylindrical segment of the drum is a second conical portion of decreasing diameter preceding away from the inlet, i.e., toward the outlet of the pressure chamber. The opposite end of the chamber from the inlet end is provided with a circular imperforate end wall.

The scraper is conveniently connected to the drum to assume a position adjacent to the inside surface of the cylindrical screen and to be carried by the drum around the inside surface of the screen as the drum rotates to temporarily remove the hydrated solids from the screen surface as it passes each point on the screen.

DESCRIPTION OF THE PREFERRED EMBODIMENT

Figure 1:
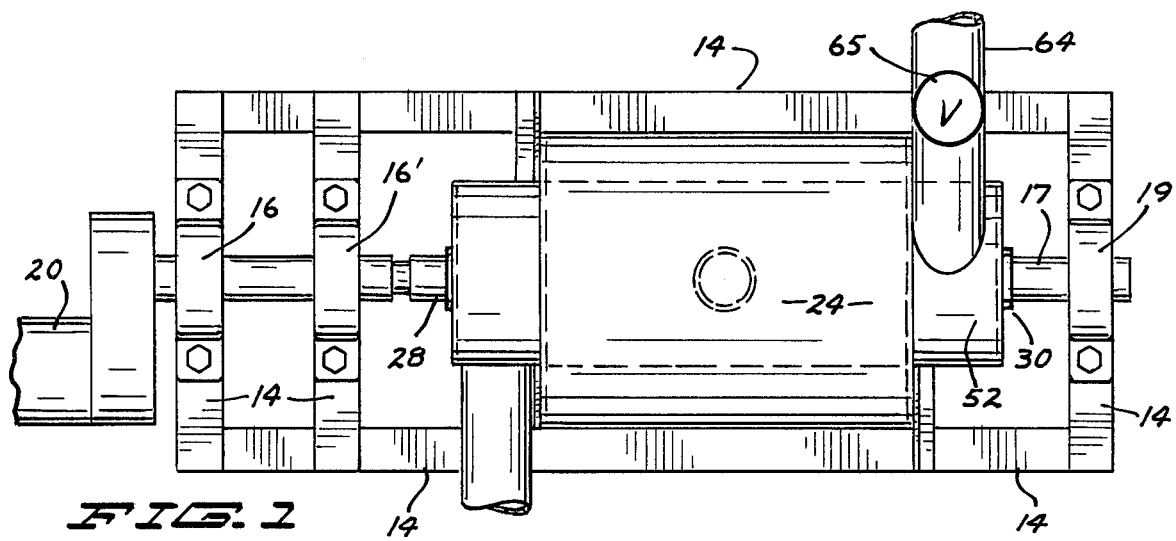
Figure 2:
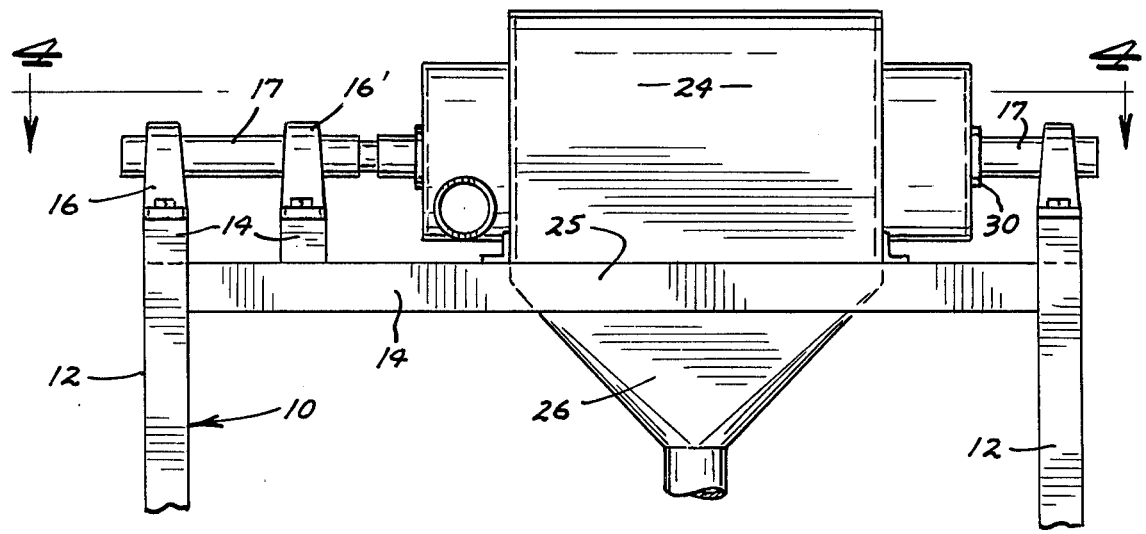
Figure 3:
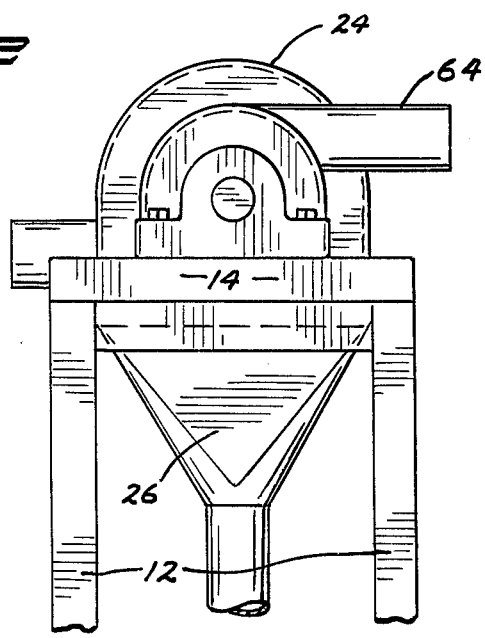

As shown in the Figures which illustrates but one form of the invention set forth by way of example, a press embodying the invention has as a base or supporting framework 10 composed of vertical and horizontal square steel tubes 12 and 14 suitably connected together as by welding to support various parts of the apparatus. Heavy duty pillow block bearings 16 and 16' are suitably rigidly mounted upon horizontal tubes 14 in alignment with each other and in alignment with a sleeve bearing 19 at the opposite end of the apparatus to rotatably support a horizontally disposed shaft 17 of pressing drum 18 which will be described in more detail below.

The shaft 17 and drum 18 are rotated at any selected speed during operation by a suitable drive motor, typically at about 5 r.p.m.

As shown in the Figures, the drum 18 is mounted concentrically within a cylindrical tubular horizontally disposed pressing screen 22 which is itself rigidly supported upon the framework within a housing defined by a removable cover 24 and collection hopper 26. The cover 24 can be quickly removed for cleaning. The shaft 17 is bolted at each end to the ends of the drum 18 to allow the drum 18 to be quickly removed for cleaning as necessary.

The drum 18 and associated structure will now be described in detail. As seen in the Figures, the shaft 17 projects into and is bolted to axially aligned bosses 28 and 30 of the drum 18 which pass respectively through openings 32 and 34 within flat circular end walls 36 and 38 of a pressure chamber 40. The openings 32 and 34 are sealed by rubber o rings 42 and 44 respectively. It can be seen that imperforate tubular extensions 46 and 48 project axially from the ends of the tubular screen 22 and are welded to the plates 38 and 36 respectively to define inlet and outlet chambers 50 and 52.

During operation, sticky elastic hydrated food substances are forced by a pump 60 through an inlet duct 62 leading to the inlet chamber 50. The material then passes from left to right in the figures between the drum 18 and the screen 22 and after a portion of the moisture contained has been removed, it is exhausted through the outlet chamber 52 and an outlet duct 64 (FIG. 1). The pump 60 can comprise any suitable high pressure positive displacement pump. One preferred pump comprises a positive displacement pump including a pair of intermeshing lobes. In the outlet duct 64 is a pressured adjustment valve 65. The pressure within the chamber 40 and across the face of the screen 22 is a function of the rate at which material is introduced by the pump 60 and by the setting of valve 65. By closing valve 65 the pressure in the chamber 40 can be increased, by opening it the pressure is correspondingly reduced.

The drum 18 comprises three major parts including a tapered or conical section 66, central cylindrical section 68 and a second conical tapered section 70. The diameter of cone 66 increases toward the outlet and cone 70 decreases toward the outlet 64. Section 66 cooperates with a cylindrical screen 22 to define a pressure chamber 40 which has a progressively decreasing cross-sectional area preceding from the inlet 62 toward the outlet 64. The center section 68 and the cylindrical screen 22 provide a constant cross-sectional area and section 70 and increasing cross-sectional area preceding toward the outlet 64.

Thus, in operation material pumped through inlet 62 into the pressure chamber 40 is subjected to a constant pressure as it travels from left to right in the figures through the apparatus until it reaches the intersection between cylindrical section 68 and the conical section 70. At this point the thickness has been reduced to less than about 2 inches and preferably less than about 1¼ inches. Excellent results were achieved with a space 1 inch thick between the drum and the screen. The drum had an O.D. of 6 inches and the screen an I.D. of 8 inches. This reduction in thickness of the material being treated to a layer about an inch or so thick, greatly facilitates the removal of water.

It will be seen that a scraper 80 is secured to the drum 18 by means of four longitudinally spaced radially extending mounting lugs 82–88 each of which has an enlarged head 90 of just the proper size to be able to pass through an opening 92 in the blade for quick removal. A slot or key hole 94 of a smaller diameter is provided just sufficiently large to accomodate the shaft of each lug 82–88. This holds the blade securely in place during operation. The blade 80 is provided with a sharp forward tip 96 which contacts the inside of the screen 22. The blade should not be tight on the lugs. By allowing a small amount of play, the blade tip can move enough to follow the contour of the screen 22. As the scraper 80 rotates, it functions to lift the hydrated elastic material away from the screen as it passes thereby preventing screen blinding.

The screen 22 is made up of a plurality of circular circumferentially extending longitudinally spaced screen elements or bars 100 which in this case is composed of a single elongated bar having winds or segments wound in helix. The term "screen element" or "bar" thus refers to just one wind of the helix but a "bar" can also refer to a ring shaped screen bar i.e., the bars of a screen made up of a plurality of parallel rings or parallel straight bars. Consequently, for the purposes of the present patent the term "bars" has both plural and singular meaning. It will be noted that each bar 100 is triangular in cross-section with a flat inwardly facing base and a sharply pointed outwardly facing edge. This provides a screen wherein the cross-sectional area of the slots between the screen elements increases rapidly preceding away from the interior of the pressure chamber between the drum and the screen thereby reducing the tendency for the screen 22 to become clogged. It can be seen that the interior surfaces of the bars 100 are coplanar. The elements 100 are rigidly secured to one another by several circumferentially spaced longitudinally extending bars 102 which are also triangular in cross-section with one base facing inwardly and one apex facing outwardly. The bars 102 can be secured rigidly to the elements 100 in any suitable manner as by welding.

The tubular screen 22 can be thought of as a bar screen of inverted wedge configuration, the term "inverted" refers to the location of the wide portion or base of the triangular bar stock which faces inwardly toward the high pressure side of the screen while the apex of the triangle faces outwardly. Screens of this configuration have been found far superior to ordinary woven wire screens which have proved to be ineffective in removing moisture from hydrated vital wheat gluten. While greatly preferred, it is not, however, utterly essential that the tubular screen 22 comprise the inverted wedge bar screen shown. It can, for example be formed from ⅛ inch thick sheet metal having punched openings that are flared outwardly by being reamed for example, at a 45° angle from the outside surface. The openings in this instance would be tapered to a smaller diameter preceding from the outside surface to the inside surface of the punched sheet.

The I.D. of the screen 22 in one working embodiment of the invention was 8 inches in diameter, the bars were formed from stainless steel. Each bar 100 and 102 was 1/16 inch on a side. The slots between the bars 100 performed outstandingly when about 0.005 inches in width.

The operation of the apparatus will now be described. It will be assumed first that the removable cover 24 is placed on top of the collecting hopper 26 and that motor 20 and pump 60 are energized. First, the valve 65 is adjusted to regulate the pressure within the pressure chamber 40. As the process continues, the slow rotation at about 5 r.p.m. of blade 80 will continuously scrape the inside surface of the screen 22. It does not appear to be necessary to vary the speed of the drum 18. The material entering the inlet 62 and chamber 50 will be subjected to a moisture expelling pressure as it moves through the dewatering pressure chamber 40 of progressively decreasing cross-sectional area, in the tapered throat section defined between the cone 66 and screen 22. The hydrostatic pressure will force much of the moisture out of the hydrated gluten thereby increasing the solids content from about 22 to about 30 percent solids by weight as the liquid flows through the slots between the bars in the screen and falls into the collection hopper 26. The gluten, less the removed water, is then exhausted through the outlet duct 64.

The drum 18 is removed for cleaning by removing cover 24 and the outlet chamber 46 from the right end of the screen 22. The screen 22 and the drum 18 can then be slid out of the right hand end of the apparatus after removing the pillow block 19 and the bolts which secure the bosses 28 and 30 to the shaft 17.

It is quite important in a case of gluten to minimize the amount of work or kneading done on the gluten to prevent damage to the molecular structure of the protein. If, however, the pressure applied is too low, not enough water will be removed. The invention is successful in removing water effectively without damaging the protein. It should also be noted that only a single moving unit is required composed of the drum and scraper. In addition, the screen described is far superior to a screen formed from metal wire, bars of other shape or perforated plate used in earlier presses. Consequently, the invention is smaller in size for a given capacity and construction costs are less. It also accomodates wide variations in flow and does not need constant speed adjustments to compensate for varying flows. Moreover, the scraper 80 coacts with the screen to allow the use of smaller openings than heretofore used. Accordingly, the invention is capable of removing water from a variety of non-fibrous amorphous food materials.

What is claimed is:
1. A press for removing liquid from amorphous material comprising,
   (a) a supporting framework,
   (b) a pressure chamber having an inlet at one end and an outlet at the other end, said chamber being mounted upon the supporting framework,
   (c) a curved screen formed from parallel bars comprising a portion of the pressure chamber,
   (d) said curved screen having a curved inner surface and having slots between the bars through which the liquid passes during operation,
   (e) pump means connected to the inlet for introducing said material into the chamber under pressure,
   (f) pressure control means connected to the outlet of the chamber through which material is exhausted from the chamber for controlling the pressure within the chamber,
   (g) a drum journaled for rotation concentrically within the chamber and spaced at a fixed uniform distance from the inner curved surface of the screen,
   (h) material flowing from the inlet to the outlet being thereby adapted to pass between the drum and the curved inner surface of the screen,
   (i) a longitudinal scraper blade between the screen and the drum extending the full length of the screen, said scraping blade having a scraping edge contacting the inner surface of the screen, and
   (j) the scraper blade being supported upon the drum without being connected thereto tightly to thereby permit play between the scraper blade and the drum whereby the blade tip can move to follow the contour of the screen,
   (k) means for imparting movement to the scraper to rotate the scraper blade within the pressure chamber whereby the scraping edge passes over the inner surface of the screen during operation, and
   (l) the pressure and flow of the material from the inlet through the pressure chamber to the outlet being controlled solely by the pump and the pressure control means.

2. The apparatus of claim 1 wherein the pressure chamber is cylindrical and has end walls adjacent the inlet and the outlet, said inlet and outlet communicate with the pressure chamber through the cylindrical wall thereof, said longitudinal scraper blade having portions extending beyond the ends of the screen and over the inlet and outlet openings in the cylindrical wall of the pressure chamber to scrape across the openings as the blade rotates.

3. The apparatus of claim 1 wherein the bars comprising the screen have slots between them on the order of about 0.005 inches in width.

4. The apparatus of claim 1 wherein the drum includes a cylindrical drum section and a conical drum section between the cylindrical section and the inlet, the conical section having a progressively increasing diameter in the direction of the cylindrical drum section.

5. The apparatus of claim 4 wherein the drum includes a conical drum section of progressively decreasing diameter proceeding toward the outlet coaxially aligned with the cylindrical section.

6. The press of claim 1 wherein, said screen comprises parallel spaced apart bar sections of inverted wedge configuration, each bar having a relatively flat base facing inwardly toward the center of the chamber and having outwardly facing walls diverging away from one another proceeding away from the space between the bars.

* * * * *